United States Patent
Mountford et al.

(10) Patent No.: US 10,852,707 B2
(45) Date of Patent: Dec. 1, 2020

(54) BLEND CONTROL TRUCK ASSIGNMENT MONITORING SYSTEM AND METHOD

(71) Applicant: Caterpillar Inc., Peoria, IL (US)

(72) Inventors: Gordon Wayne Mountford, Everton Park (AU); Greg M Wood, Sinnamon TK (AU); Russell Brockhurst, Carindale (AU); Thomas F Doherty, Brisbane (AU)

(73) Assignee: Caterpillar Inc., Peoria, IL (US)

( * ) Notice: Subject to any disclaimer, the term of this patent is extended or adjusted under 35 U.S.C. 154(b) by 258 days.

(21) Appl. No.: 15/661,308

(22) Filed: Jul. 27, 2017

(65) Prior Publication Data

US 2019/0033808 A1  Jan. 31, 2019

(51) Int. Cl.
  *G05B 19/048*  (2006.01)
  *G05B 19/042*  (2006.01)

(52) U.S. Cl.
  CPC ......... *G05B 19/048* (2013.01); *G05B 19/042* (2013.01); *G05B 2219/39242* (2013.01)

(58) Field of Classification Search
  CPC .................... G05B 19/048; G05B 2219/39242
  USPC ......................................................... 700/265
  See application file for complete search history.

(56) References Cited

U.S. PATENT DOCUMENTS

| | | | |
|---|---|---|---|
| 3,979,731 A | 9/1976 | Delchev | |
| 6,351,697 B1 | 2/2002 | Baker | |
| 6,741,921 B2 | 5/2004 | Cohen | |
| 7,853,439 B2 | 12/2010 | Menabde | |
| 7,925,474 B2 | 4/2011 | Froyland | |
| 8,626,565 B2 | 1/2014 | Petroff | |
| 9,285,117 B2 | 3/2016 | Goldberg | |
| 2003/0069680 A1* | 4/2003 | Cohen | G06Q 10/0631 701/50 |
| 2009/0096637 A1 | 4/2009 | Olson | |
| 2010/0082157 A1* | 4/2010 | McGarel | G05B 13/048 700/265 |
| 2012/0143434 A1 | 6/2012 | Donnelli et al. | |
| 2013/0008557 A1* | 1/2013 | Cohen | G05D 11/132 141/9 |
| 2015/0134184 A1 | 5/2015 | Takeda | |
| 2016/0161947 A1* | 6/2016 | Liao | G05D 1/0027 701/2 |
| 2016/0300175 A1 | 10/2016 | Talmaki et al. | |
| 2016/0343090 A1 | 11/2016 | Wood | |
| 2017/0021318 A1* | 1/2017 | McIver | B60P 1/483 |
| 2017/0169626 A1 | 6/2017 | Thomsen | |
| 2017/0313499 A1* | 11/2017 | Hughes | B60P 1/483 |
| 2019/0206007 A1* | 7/2019 | Leach | G06F 16/23 |

* cited by examiner

*Primary Examiner* — Thomas C Lee
*Assistant Examiner* — Charles Cai
(74) *Attorney, Agent, or Firm* — Bookoff McAndrews

(57) ABSTRACT

A site management system for tracking material movement in an environment includes a plurality of material sources, one or more processors, and a plurality of machines. Each of the machines operates according to operating instructions to capture material from one material source and deliver the material at or near at least one processor. The site management system also includes an environment monitoring system having a controller configured to monitor movement of the machines, track a cumulative material blend at each of the processors based on the movement of the machines, and modify the operating instructions to maintain the cumulative material blend within a target blend range.

20 Claims, 3 Drawing Sheets

BLEND CONTROL TRUCK ASSIGNMENT MONITORING SYSTEM AND METHOD

TECHNICAL FIELD

The present disclosure relates generally to a site management system and, more particularly, to a system and method for controlling cumulative material blends at processors at a site, such as a mine site.

BACKGROUND

In various industries, systems and methods are used to pick up objects or materials at one location and deliver them to one of various other locations. For example, shipping and package delivery operations often incorporate sophisticated systems and methods for picking up and dropping off packages. Another example includes the mining industry, which includes the transportation of ore from various material sources to one or more locations, such as processors, at a site. Additionally, processed ore may need to be transported to a different site or location for additional processing or mixing. The need for the material to be mixed prior to processing or further transportation can create greater inefficiencies within the mine site. As should be appreciated, material transport is one of the most important aspects in the mining industry and can represent 50-60% of costs associated with mining operations.

Even a slight reduction in costs associated with material transport may result in significant savings. As such, various systems have been implemented for controlling, or dispatching, machines at the mine site to optimize material transport and mixing to further reduce costs. The essence of these systems is to determine, every time a machine leaves a site or location in the mine, where the optimal place is for that machine to go. Determining the optimal place for the machine to go involves optimizing one or more objectives, such as, for example, minimizing the wait time of machines at processors, maximizing the overall production of the mining operation, providing the optimal material blend to the processor, or minimizing hauling distances.

Two different approaches have been implemented for machine dispatching systems. A first approach involves the use of a single-stage system, while a second approach involves the use of a multi-stage system. According to the single-stage system, machines are dispatched according to one of several criteria; however, production targets or constraints are generally not considered. According to the multi-stage system, dispatching problems can be divided into multiple stages, including an upper stage for production targets for each loader and a lower stage for assigning machines to loaders to minimize deviation from production targets. Neither of these systems was able to improve efficiency for dispatching purposes until multi-stage systems were able to adapt guidelines based on current mine environments in the upper stage, and make adjustments in the lower stage depending upon environment changes in the upper stage.

While optimizing dispatching assignments to machines may be beneficial at a mine site, some materials, such as coal, may need further processing. One process frequently necessary for coal, is blending to achieve desired quality attributes before being transported from the mine site. The quality attributes may differ between mine sites and may require materials located at various locations throughout the mine site to achieve a desired blend of materials. The desired blend may need to be achieved prior to shipping the coal to a power plant or other destination. If the coal is not properly blended, for example, power plants may be left using coal that does not match the design parameters of the facility, which may reduce efficiency of the power plant and significantly increase the fuel costs by requiring more coal to be burned than would be necessary if using the proper blended material.

Some of the transporting issues were addressed by a system disclosed in U.S. Pat. No. 6,741,921 to Cohen et al, but this system does not allow for acquisition of real-time complete mine data to be acquired at the machine hauler and loader level to ensure an optimized material blend to destination system at a mine site. Previous systems have relied on the blend data obtained solely at the crusher of a mine site, where the material is deposited. As should be appreciated, there is a continuing need to improve monitoring and controlling of equipment used in mining operations to allow for optimal blending to destination operation of materials, while maintaining efficient use of the machines located within a mine site environment.

SUMMARY OF THE INVENTION

In one aspect, a site management system for tracking material movement in an environment includes a plurality of material sources, one or more processors, and a plurality of machines. Each of the machines operates according to operating instructions to capture material from one material source and deliver the material at or near at least one processor. The site management system also includes an environment monitoring system having a controller configured to monitor movement of the machines, track a cumulative material blend at each of the processors based on the movement of the machines, and modify the operating instructions to maintain the cumulative material blend within a target blend range.

In another aspect, a non-transient computer-readable medium including program instructions for tracking material movement in an environment using a site management system is provided. The computer-readable medium further includes program instructions for obtaining real-time environmental information, including: machine location information, machine load information, material source information at a plurality of material sources, and material specification information at one or more processors. The computer-readable medium also includes program instructions for obtaining information about an optimal material blend for the processors based on anticipated future information at the processors, future environmental information, and the real-time environmental information, and determining, based on the real-time environmental information and the optimal material blend, modified operating instructions for machines to attain the optimal material blend at the processors.

In yet another aspect, a method for tracking material movement in an environment using a site management system is provided. The method includes a first step of obtaining real-time environmental information, including: machine location information, machine load information, material source information at a plurality of material sources, and material specification information at one or more processors. The method includes a second step of obtaining information about an optimal material blend at each of the processors, including: anticipated future information at each of the processors, future environmental information, and the real-time environmental information. The method includes a third step of determining, based on the real-time environmental information and the optimal material blend, modified operating instructions for machines to attain the optimal material blend at each of the processors.

Other features and aspects will be apparent from the following description and accompanying drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
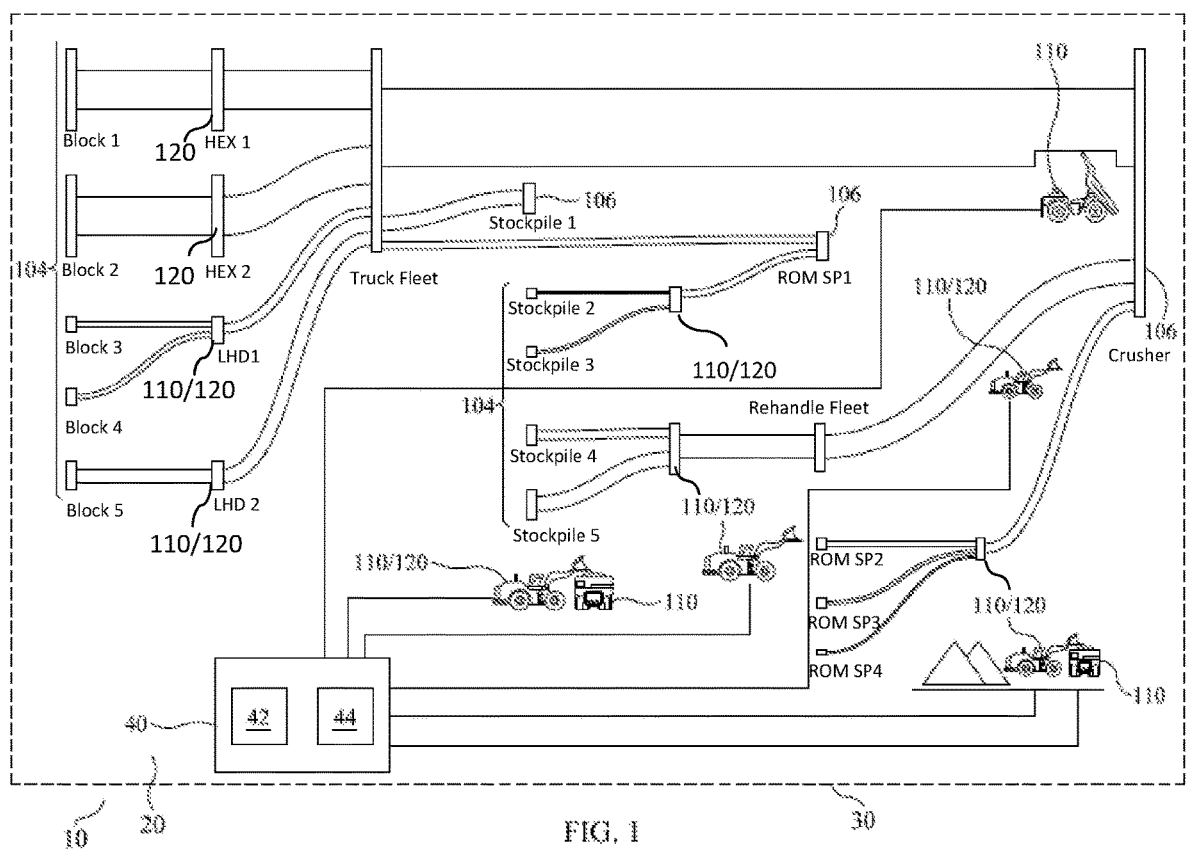
FIG. 1 is an exemplary material flow diagram for an environment, such as a mine site, and a site management system for tracking material from material sources to processors at the mine site, according to an exemplary embodiment of the present disclosure.

An exemplary environment for which the present disclosure is applicable is shown generally at 10 in FIG. 1. Although the present disclosure may be applicable to a variety of different environments 10, the exemplary system and method will be described within the context of a mine site 20. In particular, FIG. 1 depicts a Sankey diagram used for illustrating workflow at an exemplary embodiment of a mine site 20, including various material transportation routes. For example, FIG. 1 depicts various operational scenarios for transporting material at the mine site 20 from a plurality of material sources 104 (e.g., mining blocks, stockpiles, intermediate stockpiles) to one or more processors 106 (e.g., stockpiles, hauler beds, crushers, dumps). In some embodiments, processors 106 can act as intermediate material sources before the material is transported to a final processor 106, such as a crusher, or another location at the mine site 20. FIG. 1 includes all necessary unique identifier information for operational scenarios (e.g., source cardinality, source type, loader type, haulage type, and processor type) and illustrates many potential operational scenarios, including two blends at two different processors, one at a crusher, and one at a run-of-mine (ROM) stockpile, all of which may be referred to herein as processors 106.

In addition to the plurality of material sources 104 and the processors 106, the mine site 20 may include a plurality of machines 110 and loaders 120, which may include wheel loaders, haulers, hydraulic excavators (HEX), and the like. The machines 110 typically operate according to operating instructions to capture material from one material source 104 and deliver the material at or near at least one processor 106. Each of the processors 106 may receive material via upstream machines 110 from any upstream material source 104, allowing for a blend, or cumulative blend, to exist at each of the processors 106. It should also be noted that the present disclosure incorporates the use of a wheel loader or "load-haul-hump" (LHD) loaders. These loaders 120 can operate similar to both traditional loaders 120 by supplying a load to a hauling machine 110, or alternatively, loading and then transporting the load throughout the mine site 20 independent from the hauling machines 110. Unlike conventional methods for blending, the blending strategy of the present disclosure can use LHD loaders 120 for operations without the need for additional hauling machines 110 to haul material, as well as, the ability to apply blends across multiple processors 106 (e.g. dual side crusher dumping), including stockpiles. In some exemplary embodiments, the mine site 20 will still include at least one hauling machine 110 and at least one loader 120.

According to the exemplary embodiment, crushers, stockpiles, and dumps can all be modeled as processors 106. The processors 106, in combination with the recording and monitoring of work cycles of the machines 110, allow for tracking of all incoming material to a processor 106, wherein the blend of material, or cumulative blend of material, is an aggregate of all the incoming material. A desired cumulative blend can be described using a collection of constraints (e.g. minimum and maximum thresholds) for rates, grades, and materials.

A site management system 30 for tracking material movement at the mine site 20 and tracking or monitoring the cumulative material blends at each processor 106 includes the material sources 104, the processors 106, and the machines 110. The site management system 30 also includes an environment monitoring system 40 having a controller 42, which is configured to monitor movement of the machines 110, track a cumulative material blend at each processor, and modify operating instructions, for the machines 110, to maintain the cumulative material blend within a target blend rage. The environment monitoring system 40 may include a non-transient computer-readable medium 44 including program instructions for tracking material movement, as described herein.

Figure 2:
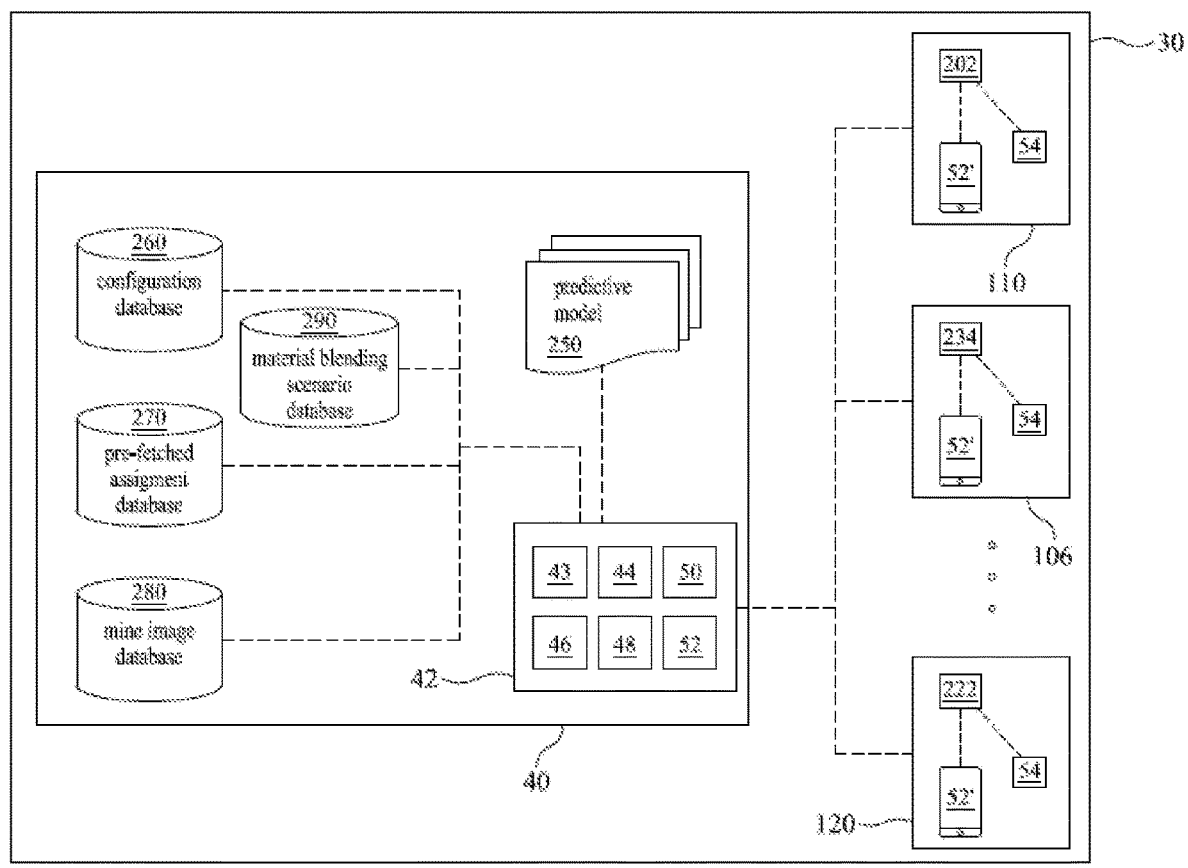
FIG. 2 is a block diagram of an environment monitoring system, according to an aspect of the present disclosure.

Turning now to FIG. 2, the one or more blending to destination system(s) 30, according to the present disclosure, may generally include at least one machine 110, at least one processor 106, and an environment monitoring system 40. In some embodiments, the system may also require at least one loader 120. The term "loader" is used broadly to encompass any piece of equipment that delivers a material load to a machine 110. In one exemplary embodiment, one or more machines 110 can include a loader 120. A machine 110 with a loader 120, such as an LHD wheel loader, can be used to deliver a material load to another machine 110 (e.g. Hauler), processor 106, or other location at the mine site 20. Machines 110 can transport ore or other materials from material sources 104 to processors 106, or alternatively, from processor 106 to another processor 106 depending upon the operational scenario. Processors 106 may include processing machines 232, such as a crusher, to receive ore or other loads from machines 110 for processing. The processors 106 can each include a monitoring system 234 to monitor material blend. The processor monitoring system 234 can monitor information about a processing machine 232, such as the current level of ore for processing. Monitoring system 234 may also include static information, such as the total capacity or processing rate of the machine. Monitoring system 234 may also include wireless communication capabilities.

Similarly, loaders can also have a monitoring system 222 to track and record historical and present information regarding the material time and quantity obtained at a material source 104. The environment monitoring system 40 can communicate with the other various monitoring systems within an environment 10, including the machine on-board computers 202, loader monitoring system 222, and processor monitoring systems 234. These monitoring systems can each comprise their own processing means, interfaces, memory and communications bus. Additionally, these monitoring systems can include one or more sensors to help capture various data, including but not limited to material load data, machine speed, and machine, machine health data, and other additional data as required by the user.

It should be understood that processors 106 consistent with the present disclosure may include one or more processing machines 232. Processing machines 232 can may include crusher machines that further blend or process the ore or materials dumped at a processor 106. Machines 110 can be dispatched to and from material sources 104 and/or processors 106 via the environment monitoring system 40. For example, after a machine 110 delivers its load to a processor 106, environment monitoring system 40 may direct machine 110 to a specific material source 110, processor 106, or machine 110.

Furthermore, a machine 110 may include an on-board computer 202. The on-board computer 202 may include an interface 52', such as a display or graphical user interface (GUI) element, to provide information to a machine operator or to the environment monitoring system 40. Further, the on-board computer 202 may include interactive elements, such as a keypad, to receive information from the machine operator. The on-board computer 202 may also be equipped with sensors 54, such as a position sensing system, and wireless communication capabilities to communicate to the environment monitoring system 40, as well as other on-board computers 202 of other machines 110. The position sensing system may include a Global Positioning System (GPS), a laser positioning system, an inertial navigation unit, or any suitable system or combination thereof. Further, on-board computer 202 may also be equipped with a vital sign monitor sensor. The vital sign monitor may monitor travel time, detect potential mechanical failures, quantify the load of the truck, or obtain other information about the truck and its operation.

As shown in FIG. 2, the environment monitoring system 40 can include at least one controller 42. The controller 42 may include a single computer-processing device 43 (e.g., a central processing unit, graphics processing unit, or other computational device), or may include a plurality of computer processing devices. In some exemplary embodiments, all processing can be performed by the controller 42. Additionally, processing may also, or alternatively, be performed by remote processing devices accessible and useable (either in a shared or dedicated manner) by the system 30.

Through a communications bus 44 the controller 42 is in data communication with a one or more machine-readable storage (memory) devices that store instructions and/or data for controlling operation of the environment monitoring system 40. In this instance, the environment monitoring system 40 can include a system memory 46 (e.g. a BIOS), volatile memory 48 (e.g., random access memory, such as one or more DRAM modules), and non-volatile memory 50 (e.g., one or more hard disk or solid state drives).

The environment monitoring system 40 also includes one or more interfaces, indicated generally by 52, via which the environment monitoring system 40 interfaces with various devices, networks, and/or users. In some embodiments, the interface 52 can include a graphical interface or visual display to communicate data or instructions to a user. The display 52 can present data, such as the real-time environmental information, optimized blend input data, and operational instructions. The predictions or information provided to a user can allow for both automated responses by the machines 110, as well as, manual responses and manual inputs implemented by a user to alter or improve the cumulative material blend. Some of these manual inputs can include providing information regarding material specifications from the source, vehicle information, as well as, operating instructions, which may include instructions to maintain or achieve the cumulative material blend at a processor 106. These manual inputs can include communications throughout the mine site 20 for corrective operations or maintaining current operations. Similarly, a user could determine based on information that may not be obtained by the environment monitoring system 40 to manually change the systems 30 operating instructions.

Generally speaking, other devices may be physically integrated with the environment monitoring system 40, or may be physically separate. Where a device is physically separate from the environment monitoring system 40, connection between a device, such as a machine 110 or processor 106, and the environment monitoring system 40 may be via wired or wireless hardware and communication protocols, and may be a direct or an indirect (e.g. networked) connection.

Wired connection with other devices/networks may be by any appropriate standard or proprietary hardware and connectivity protocols. For example, the environment monitoring system 40 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, the environment monitoring system 40 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which the environment monitoring system 40 connects, whether by wired or wireless means, allow data to be input into/received by the environment monitoring system 40 for processing by the controller 42, and data to be output by the environment monitoring system 40 of the system 30. Example devices are described below, however it will be appreciated that not all computer-processing systems will include all mentioned devices, and that additional and alternative devices to those mentioned may well be used, including to on-board computers 202 found on other devices of the system 30.

The environment monitoring system 40 can further include a predictive model 250, configuration database 260, a pre-fetched assignment database 270, a mine image database 280, and material blending database 290. Configuration database 260 can include current system settings, such as choice of optimization criterion, specifications of blending requirements, and other solution parameters. Pre-fetched assignment database 270 can include updated truck dispatch assignments, before the dispatch assignments are provided to machines 110. Mine image database 280 can include information about the mine, including information about each piece of equipment (such as location and current status), information about material excavated by each loader, the current blending at each processing machine, and other relevant mine information.

The material blending database 290 can include operational scenarios for use of the machines 110 with loaders 120, such as wheel loaders/LHDs, within the mine site 20. The system 30 can track and manage material movement by a machine 110 to and from various locations throughout a mine site 20 based on a pre-determined mix of materials to achieve the desired cumulative material blend for each processor 106. For example, a material specification mix can be expressed as a ration between various stockpile sources, wherein various material is located at a stockpile 1, stockpile 2, and stockpile 3, with a material specification requiring a 2:1:1 ratio of materials from the respective stockpiles. The environment monitoring system 40 can communicated to an on-board computer 202 of a machine 110 to recommend or assign which source 104 and processor 106 the machine should pick up material and subsequently deliver the material respectively.

The material blending scenario database 290 can provide a production view of the mine site 20 and detail how various machines 110, loaders 120, and processors 106 are operating to achieve a particular cumulative material blend at a processor 106 and other production requirements of the mine site 20. These scenarios can be used with the predictive model 250 to optimize the mine site operations using the blending to destination system 30 of the present disclosure. Various scenarios will be further discussed below with regards to industrial applicability.

The controller 42, may receive information via wireless communication, from an on-board computer 202, loader monitoring system 222 and processor monitoring system 234. The memory 46 can include instruction for performing a variety or processes required to optimize material transport and material blending. For example, the memory 46 may include instruction for populating the configuration database 260, determining default blending to destination assignments, determining pre-fetch assignments, providing assignments to machines 110 and loaders 120, and optimizing blending of materials based on the stored or real-time information from the various databases described above, on-board computers 202 of the machines/loaders 202 and the loader monitoring system 232 and processor monitoring system 234.

The individual processor monitoring systems 234 can monitor the flow rate for the material located at and flowing into a processor 106, and communicate that information to the environment monitoring system 40. The environment monitoring system 40 can then use this data to determine the processors 106 individual material specification, and if it is above or below the thresholds for the desired material specification. Each processor 106 may have the same or different material specification.

Additionally, the material specification at the processor 106 can be a static or a dynamic blend. A processor having a static blend is configured to operate independently of other blends at the mine site 20. With static blends, an individual machine 110 is not affected by the movements of other machines movements to a processor 106. Static blends are typically used if it is the only operational scenario contributing to a particular material blend at a processor 106.

Whereas, dynamic blends are configured to assist in minimizing the non-conformance of a particular cumulative material blend at a processor 106. Dynamic blends require a blend to exist, and include additional values such as travel time of a machine 110 to estimate the blend scenario for a dynamic blend. When the environment monitoring system 40 can initiate command for a dynamic blend to the on-board computer 202 of a machine 220. The machine 110 may be instructed to "do nothing" or provided other instructions depending on the real-time information obtained by the processor monitoring system 234 and if the blend of materials at the specific processor 106 are in conformance with the dynamic blend. The material blending scenario database 290 can include various static and dynamic blend scenarios depending upon environmental information, obtained by the environment monitoring system 40.

A processor monitoring system 234 can use various methods to monitor and measure the conformance of a material blend. Such methods can include a rolling mass, rolling window, batch mass, batch window, weight averaging, and prorating. Similarly the system 30 can be used for either continuous or discrete grade blending criteria based on the mine environment and type of mine. Source material information be used to establish cumulative material blend specifications using source ratios. In some instances, these rations can be defined by either mass or volume. Volume based measuring can be achieved by monitoring the machine cycles, whereas mass based ratios can be calculated using a conversion of volume ratios using the density of source materials. Alternatively, in one exemplary embodiment, a load sensor on a machine 110 can obtain an approximate weight of the materials being transported to a processor. Similarly, the processor monitoring system 234 can monitor the throughput of materials at the processor to determine the quantity of the source material being processed. The system 30 can use one or more of these systems or methods to monitor the transportation of material throughout the mine site 20 and for predicting future cycles and the effect on a cumulative material blend at a processor 106.

Figure 3:
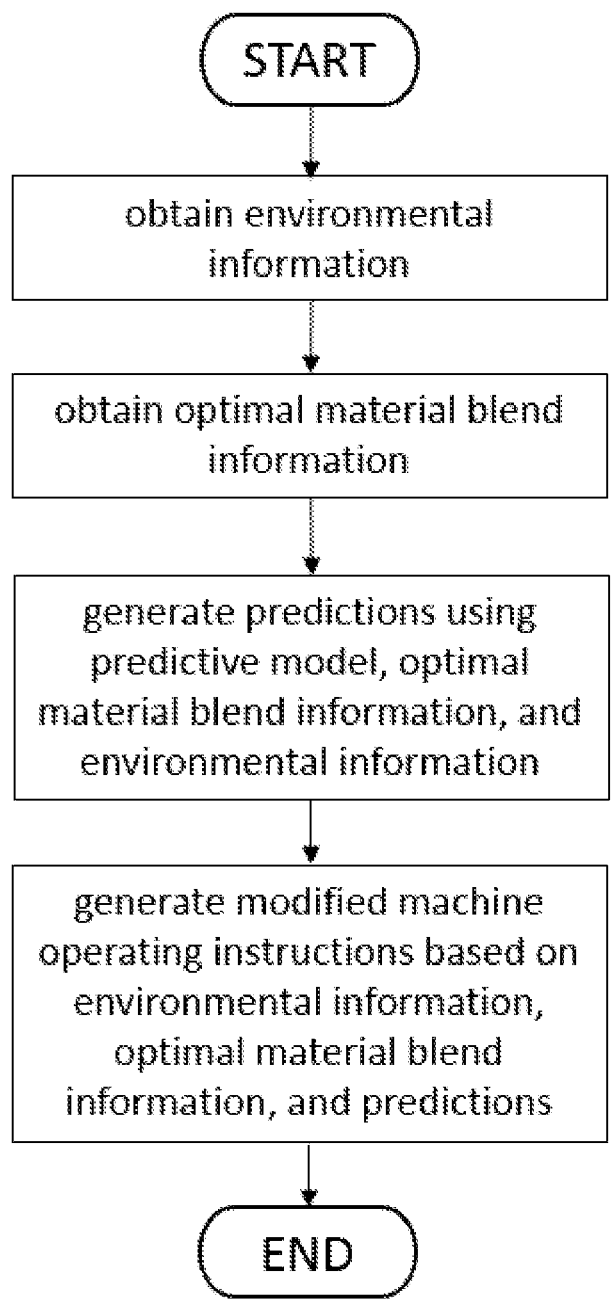
FIG. 3 is a flow diagram of an exemplary method for tracking materials using the site management system and environment monitoring system of the previous FIGS.

As shown in FIG. 3, the environmental monitoring system 40 can perform a method of material to destination operation within a mine site by obtaining real-time environmental information and information about the optimal material blend. The environment monitoring system 40 can then generate one or more predictions using the above information with a predictive model. In one embodiment, the system 30 may generate a prediction for the next preceding machine 110 cycle. Similarly, the predictive model 50 can predict a plurality of future machine cycles when determining if modified operating instructions are required to maintain the cumulative material blend. In one embodiment, the system 30 can predict at least 10 machine cycles into the future. Additionally, the system can average a plurality of predicted machine cycles when determining the need for modified operating instructions. The predictive model can minimize cumulative material blend non-conformance. This model can continue generating predictions to minimize or achieve a cumulative material blend until the latest estimated time of delivery of material from a machine 110, or for a set period of time into the future. Additionally, if a specific amount of material throughput to a processor has been achieved the system 30 can stop generating predictions and similar cease operations of any designated machines 110 or processors 106.

Based on the generated predictions, the system 40 can generated modified operating instructions for machines within the environment to obtain an optimal material blend at the processors. The predictions as well as other information, such as environmental and blend information, can be displayed on an interface 52 to a user to show when a potential problem will occur with the blend prior to the problem occurring and can display to a user or initiate modified operating instructions to prevent a potential problem. Similarly, when the predicted problem is displayed via the interface 52 to a user, the user can manually generate operating instructions, initiate operating instructions, or both. The system 30 may predict that due to specific environmental information and constraints that the cumulative material blend may by unable to be kept in specification given environmental constraints (e.g. equipment availability, source material availability, etc.). This can allow a user to manually address potential problems/issues that may affect the cumulative material blend before significant problems arise. Similarly, the system 30 can be configured to automatically initiate modified operating instructions by the controller 42 to limit or minimize a predicted problem.

The real-time environmental information can include location information of machines within the environment, machine load information, material source information at the sources, and material specification information at the processors. The optimal material blend scenario can use anticipated future information at the processors, future environmental information, and real-time environmental information to determine an optimal scenario. By using real-time environmental information and the optimal material blend scenario, the system can determine any modified operating instructions that may be needed for one or more of the machines 110 or loaders 120 within the environment. In certain cases, no modified operational instructions may be generated.

More specifically, using the environmental information obtained by the environment monitoring system 40, the controller 42 can provide operational instruction to the machines 110, loaders 120, and processors 106 at the mine site 20. The system of the present disclosure can first access the environmental information generated by the machines 110 and various monitoring systems. The environmental information can include information such as source cardinality (one or multiple sources per machine), source type (stockpile or mining block), machine/loader type (wheel loader or loader/HEX, haulage type (wheel loader or truck), and processor type (stockpile, crusher, or dump). Additionally, the environmental information/information can include real-time information of aspects of the mine, such as location information of machines within the mine, vehicles load information, material source information, and material specifications for the various processing sites. This environmental information can then be compared against a cumulative material blend specification designated at each of the processors 106.

The system 40 can then generate an optimal material blend input for each of the processors. The system 40 can then access the location and load data for the machines located in the mine site environment 20 and access the material blend scenario database 290 for operational instructions currently being executed by the machines 110 in the environment. The system can then generate one or more predictions using a predictive model 50, the optimal material blend input, and machine location and load data. Based on the predictions, the system can provide modified operating instructions to one or more machines within the environment. The use of LHD machines 110 at a mine site 20 further allow for greater ability to maintain the material specification within the target range. The system 30 can use one or more wheel loaders to help maintain the blend at the pre-determined material specification. The system can be predicted on various data including inbound machines 110 to the processor 106 that will be added to the cumulative material blend and loader machine 110 predictions, such as LHD machines 110 that may be used to maintain the cumulative material blend within the target range. Depending upon the blend type (static vs. dynamic) the future predictions can be re-evaluated at set pre-determined time. For dynamic blends, these predictions can be set to be calculated as desired by the user. In one exemplary embodiment, the re-evaluation period can be calculated every 30 seconds. Alternatively, these predictions can be calculated in the occurrence of an unexpected event, such as a machine failure. Each machine cycle from a material source 104 to a processor can be recorded and monitored to predict future cycles and the optimized operational instructions to machines 110 throughout the mine site 20.

The method of operating the blending to destination system 30 or, more particularly, optimizing operation of the blending to destination system 30, may include execution of various optimization programs/scenarios stored in the material blending scenario database 290 or created by the environment monitoring system 40 during the optimization process described below. The method may be implemented in whole or in part by the controller 42 of the environment monitoring system 40, with all or portions of the method running continuously or intermittently, such as at predetermined intervals. Additionally, the environment monitoring system 40 can communicated to individual on-board computers 202 of individual machines 110, loader monitoring systems 222 of one or more loaders 120, and processor monitoring systems 234 of the one or more processors 106.

Unlike traditional mine operations that only monitor the material being provided at a single crusher by traditional hauling machines, the system of the present disclosure allows for complete monitoring of material throughout the entire mine site 20 as it is being loaded, transported, and dumped throughout the mine site 20. The individual monitoring systems of the machines, processors, and loaders, can act to establish "virtual" processors 106 at various points throughout the mine site 20, other than just at the traditional crusher, to capture environmental information, such as the material source (e.g. type, quantity, location, etc.) and machine 110 data (pre-assigned destination, pre-mixed blend, pre-assigned route, etc.) when determining the optimized operational instructions for one or more machines 110 and/or loaders 120 at a mine site 20. The virtual processors 106 can include, but are not limited to crushers, stockpiles, hauler beds, and other material destinations within the mine site 20. These virtual processors 106 can track various machine cycle information for machines 110 moving to and from the processors 106. The data acquired can then be used to better anticipate and determine the future cumulative material blend at the one or more processors 106. Based on this information, the environmental monitoring system can, if necessary, modify the operating instructions for the various machines 110 within the system 30. Similarly, if the cumulative material blend specifications at a processor 106 changes specification, or falls out of the target blend range, the environment monitoring system 40 can accesses the various load and material information within the mine site 20 to determine if any corrective or modified operating instructions must be communicated to one or more of the machines 110 or loaders 120.

The system 30 can record and monitor various machine cycles. For example, the system 30 can monitor when a LHD machine 110 acting as a loader 120 is dumping material into a hauler machine 110. Rather than only capturing information on the hauler machine 110, the system of the present disclosure will capture information for every load provided to the hauler 110 by a loader 120. This will then be monitoring each load provided to the hauler 110 as a cycle for the one or more loaders 120. When the hauler 110 has been completely loaded the cycles for the one or more loaders 110 can be aggregated and to better account for the blend being transported by the hauler 110. The system 40 can then assign the hauler 110 to a specific processor 106 based on the material blend being carried by the hauler 110. This allows the system to capture material blend data in greater detail to ensure that the cumulative material blend at the processors 106 can be achieved and maintained. Based on the various machine cycle information acquired by the system 40 from the other processing systems, the system 40 can use a predictive model 50 to determine if any modified operation instructions are needed to ensure the target blend range of the cumulative material blend is met and maintained at the processors 106.

INDUSTRIAL APPLICABILITY

The present disclosure relates generally to a blending to destination system at a mine site 20. The blending to destination system of the present disclosure ensures that the processing plant is delivered material as specified, that stockpiles are maintained with acceptable grade and material homogeneity, and that dump material conforms to design requirements for the specific mine site 20.

For example, a mine may include a plurality of machines 110, such as LHD machines or hauler trucks, and one or more processors 106. The mine may also include loaders 120, which can be relatively stationary to provide material to a hauler machine 110, or alternatively, attached to LHD machines 110, which can transport and dump material to a processor 106, or to another machine 110, such as a hauler. Depending upon the operational scenario, the movements of the machines and loaders can be recorded as a machine cycle that captures environmental information, such as material type and load.

As previously mentioned the material blending scenario database 290 can be used to optimize operations at a mine site 20 depending upon the mine layout, machines, and loaders at the mine site 20. One of these scenarios can include the use of a wheel loader machine 110 that operates as a loader 120 to pick up material from various material sources 104 in close proximity to a processor 106, and then as a hauler machine 110 to transport the load directly to the processor 106. In this scenario, the wheel loader/LHD machine 110 can transport material directly to the processor 106 without loading the material into a larger hauler machine 110. Each one of these cycles can be monitored by the environmental monitoring system 40 and used to predict future cycles and an optimal blend input for the processor 106.

In an alternative operational scenario, the loader machines 110 can transport material from one source 104 and move it to another source 104 closer to the processor. This scenario can be used to provide greater efficiency in transporting materials and also help achieve a pre-blend stockpile closer to the processor 106. Another operational scenario may involve a hydraulic mining loader 120 that stays in a relative stationary position within the mine site 20. The loader 120 can load material into a machine 110 to be transported and dumped into a processor 106. The processor 106 either a crusher or stockpile for pre-blending material to a cumulative material blend before being transported to a crusher or other processor 106. If the environmental determines that material from one source 104 is not needed or is unwanted, it may direct the machine 110 to another processor 110, such as a stock pile for dumping. This operational scenario can be further separated into two operational scenarios, a first where the processor is a crusher 106, and a second where the processor 106 is a stockpile.

Another blend scenario can include a LHD machine 110 having a loader 120 digging material from a source 104, transporting and dumping the material into a hauler truck machine 110, that then transports and dumps the material into a processor 106. In this operational scenarios, two processors 106 may be present, one at the point of the wheel loader machine 110 dumping material into the hauler, and another at the point of the hauler dumping the material into a stockpile or crusher. In some operational scenarios, the LHD machine may be able to operate within only one mining block or in multiple mining blocks. This constraint can effectively divide the operational scenario into two separate scenarios, one wherein the LHD machine operates in a single mining block, and a second wherein the LHD operates in multiple mining blocks. Additionally, each of these operational scenarios can effectively be divided into two separate scenarios, one wherein the material from the hauler is dumped into a stockpile and a second wherein the material is provided to a crusher.

These various scenarios can help in predicting machine cycles and operating assignments of machines 110 within a mine site 20 and can be used to establish initial operating instructions for the equipment at a mine site 20. Depending upon the operational scenario, the environment monitoring system 40 can determine if the operating instructions need to be modified in order to maintain or achieve the cumulative material blend at a processor 106. A single mine site 20 could be have one or more of these scenarios operating within the mine site 20.

Whereas some mining systems only assign instructions based on various guidelines to minimize a truck idle time or transport time, the system 30 of the present disclosure may also accounts for the desired cumulative material blend at a processor 106, and predicts and modifies operational instructions to efficiently achieve or maintain the cumulative material blend within the target blend range in order to further drive the total mining efficiency. Previous systems did not allow for as much granular monitoring of material movement throughout the mine site 20 and only accounted for the cumulative material blend at a processor/crusher site.

The use of the virtual processors 106 throughout a mine site 20 by using the monitoring systems of the various machines, loaders, and processors, allow for greater control and optimization at the mine site 20 by allowing materials to be blended to specification either at the crusher, other stockpiles, or at the hauler within a mine site 20. The environment monitoring system can use the environmental information and an optimal material blend scenario to determine if modified operating instructions are necessary for the one or more machines 110 at the mine site 20. The real-time environmental information can include location information of machines, loaders, and processors within the mine environment, current vehicle load information, material source information at the sources, and material specifications at each processor. The predicted future environmental information from the monitoring systems, can include predicted machine cycles and future environmental information based on the machine cycles and current real-time environmental information.

While the disclosed embodiment utilizes machines in a mining environment, the system and method described herein have utility in other environments where dispatch instructions and material transfer optimization are provided to a plurality of machines traveling between different locations within an environment. Such other possible applications include, for example, moving products, either by vehicle or multi-route conveyor system, between various assembly line segments in a large scale manufacturing environment or shipping environments.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A site management system for tracking material movement in an environment, including:
   a plurality of material sources;
   a plurality of material processors;
   a plurality of machines, wherein each of the machines operates according to operating instructions to capture material from one material source of the plurality of material sources and deliver the material at or near at least one of the plurality of material processors; and
   an environment monitoring system having a controller configured to:
      monitor movements of the machines;
      track a cumulative material blend at each of the material processors based on the movements of the machines; and
      based on the monitored movements of the machines and the tracked cumulative material blend at each of the material processors, modify the operating instructions for one or more of the machines to maintain the cumulative material blend within a target blend range at each of the material processors,
   wherein at least one of the material processors includes a target material blend that is different from a target material blend of another one of the material processors.

2. The site management system of claim 1, wherein the machines include one or more loaders and one or more haulers.

3. The site management system of claim 1, wherein the plurality of material processors includes one or more of a crusher, a stockpile, or a machine bed, and
   wherein tracking the cumulative material blend at each of the material processors includes monitoring a flow rate of material at each of the material processors.

4. The site management system of claim 1, wherein the controller communicates with:
   a configuration database;
   a pre-fetched assignment database;
   a mine image database; and
   a material blending scenario database;
   wherein the configuration database, the pre-fetched assignment database, the mine image database, and the material blending scenario database are each operably connected to a processor of the controller.

5. The site management system of claim 1, wherein the machines are configured to communicate environmental information to the controller.

6. The site management system of claim 5, wherein the environmental information includes source material specifications, processing site material specifications, machine location information, and machine load information.

7. The site management system of claim 1, wherein each machine has an on-board computer having a display configured to provide operational instructions to a user.

8. The site management system of claim 4, wherein the controller is further configured to:
   access environmental information generated by the machines and the environment monitoring system;
   compare the environmental information against the cumulative material blend for each material processor;
   generate a target material blend input for each material processor;
   access the mine image database for machine location information and machine load information for the machines;
   access the material blending scenario database for operational scenarios based on information from the mine image database;
   generate one or more predictions using a predictive model, the target material blend input, and machine location information; and
   provide modified operating instructions for the machines in the environment using the one or more predictions.

9. The site management system of claim 7, wherein the controller is further configured to:
   communicate with the on-board computer of a selected machine;
   generate modified operating instructions for the selected machine; and
   display the modified operating instructions on the display of the selected machine.

10. The site management system of claim 9, wherein the modified operating instructions provide that the selected machine takc takes no further action.

11. The site management system of claim 9, wherein the modified operating instructions provide that the selected machine continues to operate according to current operating instructions.

12. A non-transient computer-readable medium including program instructions for tracking material movement in an environment using a site management system, the computer-readable medium further including program instructions for:
   obtaining real-time environmental information, including: machine location information for a plurality of machines, machine load information for the plurality of machines, material source information at a plurality of material sources, and material specification information at a plurality of material processors;
   obtaining information about a target material blend for each of the material processors based on anticipated future information at each of the material processors, future environmental information, and the real-time environmental information, wherein at least one of the material processors includes a target material blend that is different from a target material blend of another one of the material processors; and
   determining, based on the real-time environmental information and the target material blend for each of the material processors, modified operating instructions for one or more of the machines to obtain the target material blend at each of the material processors.

13. The computer readable medium of claim 12, further including program instructions for providing the modified operating instructions to a display of each machine.

14. The computer readable medium of claim 12, wherein the material specification information includes a minimum threshold value and a maximum threshold value.

15. The computer readable medium of claim 12, wherein the machine load information includes size and material type.

16. The computer readable medium of claim 12, wherein the program instructions further include using the real-time environmental information to predict machine maintenance or downtime in the future.

17. A method for tracking material movement in an environment using a site management system, the method including steps of:
obtaining real-time environmental information, including: machine location information for a plurality of machines, machine load information for the plurality of machines, material source information at each of a plurality of material sources, and material specification information at a plurality of material processors;
obtaining information about a target material blend at each of the material processors, including: anticipated future information at each of the material processors, future environmental information, and the real-time environmental information; and
determining, based on the real-time environmental information and the target material blend at each of the material processors, modified operating instructions for one or more of the machines to obtain the target material blend at each of the material processors, wherein at least one of the material processors includes a target material blend that is different from a target material blend of another one of the material processors.

18. The method of claim 17, further including;
a step of storing the modified operating instructions in a database; and
a step of providing the modified operating instructions to the machines.

19. The method of claim 18, wherein the anticipated future information at the material processors includes material blend information based on the real-time environmental information and initial operating instructions, and
further comprising using the real-time environmental information to predict machine maintenance or downtime in the future.

20. The method of claim 17, wherein the plurality of material processors includes one or more of a crusher, a stockpile, or a machine bed, and
wherein the plurality of machines includes one or more loaders and one or more haulers.

\* \* \* \* \*